(12) United States Patent
Bao et al.

(10) Patent No.: US 8,869,025 B2
(45) Date of Patent: Oct. 21, 2014

(54) METHOD AND SYSTEM FOR IDENTIFYING ADVERTISEMENT IN WEB PAGE

(75) Inventors: Shenghua Bao, Beijing (CN); Zhong Su, Beijing (CN); Li Zhang, Beijing (CN); Xiao Xun Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 505 days.

(21) Appl. No.: 12/893,187

(22) Filed: Sep. 29, 2010

(65) Prior Publication Data

US 2011/0078558 A1 Mar. 31, 2011

(30) Foreign Application Priority Data

Sep. 30, 2009 (CN) .......................... 2009 1 0177336

(51) Int. Cl.
*G06F 17/00* (2006.01)
*G06Q 30/02* (2012.01)
*G06F 17/30* (2006.01)

(52) U.S. Cl.
CPC ............ *G06Q 30/02* (2013.01); *G06Q 30/0277* (2013.01); *G06F 17/30908* (2013.01)
USPC ........................ 715/234; 705/14.73

(58) Field of Classification Search
CPC ..................... G06F 17/30908; G06Q 30/0277
USPC ........................................ 715/234
See application file for complete search history.

(56) References Cited

U.S. PATENT DOCUMENTS

| | | | | |
|---|---|---|---|---|
| 7,971,137 B2 * | 6/2011 | Jindal et al. | .................... | 715/234 |
| 7,996,519 B1 * | 8/2011 | Brown et al. | ................. | 709/224 |
| 8,060,601 B1 * | 11/2011 | Brown et al. | ................. | 709/224 |
| 8,086,725 B1 * | 12/2011 | Liang et al. | .................... | 709/224 |
| 8,095,530 B1 * | 1/2012 | Lloyd | ........................... | 707/709 |
| 2004/0158799 A1 | 8/2004 | Breuel | | |
| 2006/0218143 A1 * | 9/2006 | Najork | .............................. | 707/6 |
| 2006/0235960 A1 * | 10/2006 | Lai et al. | ....................... | 709/224 |
| 2007/0204223 A1 * | 8/2007 | Bartels et al. | ................. | 715/540 |
| 2007/0260520 A1 | 11/2007 | Jha et al. | | |
| 2008/0120533 A1 * | 5/2008 | Lazier et al. | .................. | 715/234 |
| 2008/0263026 A1 | 10/2008 | Sasturkar et al. | | |
| 2008/0301116 A1 * | 12/2008 | Wang et al. | ........................ | 707/5 |
| 2009/0024470 A1 * | 1/2009 | Mandelson et al. | ............ | 705/14 |
| 2009/0049062 A1 | 2/2009 | Chitrapura et al. | | |
| 2009/0070366 A1 | 3/2009 | Zhao et al. | | |
| 2009/0171986 A1 | 7/2009 | Chitrapura et al. | | |
| 2010/0094860 A1 * | 4/2010 | Lin et al. | ....................... | 707/709 |
| 2010/0316300 A1 * | 12/2010 | Epshtein et al. | .............. | 382/229 |
| 2011/0029393 A1 * | 2/2011 | Apprendi et al. | .......... | 705/14.73 |

FOREIGN PATENT DOCUMENTS

| | | |
|---|---|---|
| WO | WO0233584 A1 | 4/2002 |
| WO | WO2008157322 A1 | 12/2008 |

* cited by examiner

*Primary Examiner* — Laurie Ries
*Assistant Examiner* — Benjamin J Smith
(74) *Attorney, Agent, or Firm* — Jon A. Gibbons; Fleit Gibbons Gutman Bongini & Bianco PL

(57) ABSTRACT

A method, system and computer program product for identifying an advertisement in a web page. The method includes the steps of: receiving a sample page; analyzing a source code of the sample page to obtain a node feature of the sample page; analyzing the node feature using a preset rule to find a sample advertisement in the sample page; analyzing a first link of the sample advertisement to obtain a link mode of the sample advertisement; and utilizing the link mode to identify a second advertisement, where at least one of the steps is carried out using a computer device so that the advertisement in a web page is identified.

16 Claims, 7 Drawing Sheets

| URL feature | Link1 | Link2 | Pattern |
|---|---|---|---|
| Protocol | http | http | http |
| host | host.company.com | host.company.com | host.company.com |
| site | company.com | company.com | company.com |
| path | host.company.com/ads | host.company.com/ads | host.company.com/ads |
| page | Click.jsp | Click.jsp | Click.jsp |
| Parameter1 | id | id | id |
| Value1 | 103 | 20 | Numbers |
| Parameter2 | type | type | type |
| Value2 | c | df | Characters |

| URL feature | Link1 | Link2 | Pattern |
|---|---|---|---|
| Protocol | http | http | http |
| host | host.company.com | host.company.com | host.company.com |
| site | company.com | company.com | company.com |
| path | host.company.com/ads | host.company.com/ads | host.company.com/ads |
| page | Click.jsp | Click.jsp | Click.jsp |
| Parameter1 | id | id | id |
| Value1 | 103 | 20 | Numbers |
| Parameter2 | type | type | type |
| Value2 | c | df | Characters |

FIG. 3

Sample page 1 bla bla bla bla bla bla bla bla bla bla bla bla bla bla bla bla bla...

| Advertisement 1 |
|---| advertisement for company d

```
<html>
<head>
  <title> sample page 1</title>
</head>
<body>
  <h1> Sample page 1</h1>
  <p> bla bla bla  bla bla bla  bla bla bla  bla bla bla  bla bla bla  bla bla bla... </p>

<a href = "http://host.company.com/ads/click.jsp?id=103&type=c">  <img src = "ad1.jpg" > </a>

<a href = "http://host.company.com/ads/click.jsp?id=104&type=d"> advertisement for company d</a>

</body>
</html>
```

Sample page 2 bla bla bla bla bla bla bla bla bla bla bla bla bla bla bla bla bla...

| Advertisement 2 |
|---| advertisement for company e

```
<html>
<head>
  <title> sample page 2</title>
</head>
<body>
  <h1> Sample page 2</h1>
  <p> bla bla bla  bla bla bla  bla bla bla  bla bla bla  bla bla bla  bla bla bla... </p>

<a href = "http://host.company.com/ads/click.jsp?id=20&type=df">  <img src = "ad2.jpg" > </a>

<a href = "http://host.company.com/ads/click.jsp?id=204&type=e"> advertisement for company e</a>

</body>
</html>
```

FIG. 4A

Sample page 1 bla bla bla bla bla bla bla bla bla bla bla bla bla bla bla bla bla bla...

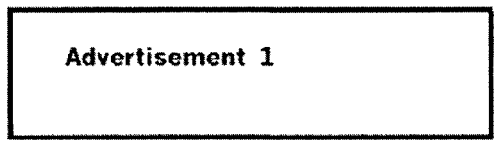

Left:8px    Upper:124px
Width:325px    Height:91px advertisement for company d

FIG. 4B

Sample page 1 bla bla bla bla bla bla bla bla bla bla bla bla bla bla bla bla bla bla...

advertisement for company d

Sample Advertisement 1

Sample page 2 bla bla bla bla bla bla bla bla bla bla bla bla bla bla bla bla bla bla...

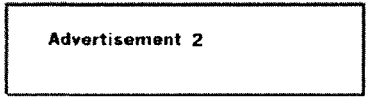

advertisement for company e

Sample Advertisement 2

FIG. 4C

_METHOD AND SYSTEM FOR IDENTIFYING ADVERTISEMENT IN WEB PAGE_

CROSS-REFERENCE TO RELATED APPLICATION

This application claims priority under 35 U.S.C. §119 from Chinese Patent Application No. 200910177336.4 filed Sep. 30, 2009, the entire contents of which are incorporated herein by reference.

BACKGROUND OF THE INVENTION

The present invention relates to a technique of identifying components which make up a web page. More specifically, a technique for identifying advertisements within a web page is shown.

Today, advertisements are discovered by detecting a block of content located in the lower left corner of a web page or pop-up window with flickering effects. However, since advertisements are now appearing in links and within titles of non-advertising text, it is more difficult to detect these advertisements using the past methods.

SUMMARY OF THE INVENTION

Accordingly, one aspect of the present invention provides a method for identifying an advertisement in a web page, the method including the steps of: receiving a sample page; analyzing a source code of the sample page to obtain a node feature of the sample page; analyzing the node feature using a preset rule to find a sample advertisement in the sample page; analyzing a first link of the sample advertisement to obtain a link mode of the sample advertisement; and utilizing the link mode to identify a second advertisement, where at least one of the steps is carried out using a computer device so that the advertisement in a web page is identified.

Another aspect of the present invention provides a system for identifying advertisements in a web page, the system including: a receiving module for receiving a sample page; an analyzing module for analyzing a source code of the sample page to obtain a node feature of the sample page; an analyzing module for analyzing the node feature using a preset rule to find a sample advertisement in the sample page; an analyzing module for analyzing a first link of the sample advertisement to obtain a link mode of the sample advertisement; and an utilizing module for utilizing the link mode to identify a second advertisement.

Another aspect of the present invention provides a computer readable storage medium tangibly embodying a computer readable program code having computer readable instructions which when implemented, cause a computer to carry out the steps of: receiving a sample page; analyzing a source code of the sample page to obtain a node feature of the sample page; analyzing the node feature using a preset rule to find a sample advertisement in the sample page; analyzing a first link of the sample advertisement to obtain a link mode of the sample advertisement; and utilizing the link mode to identify a second advertisement.

BRIEF DESCRIPTION OF THE DRAWINGS

FIG. 3 shows a table for analyzing a URL feature by utilizing a regular expression according to an embodiment of the invention.

FIG. 4A shows two exemplary sample pages and their corresponding HTML source codes according to an embodiment of the invention.

FIG. 4B shows a node feature in the first sample page in FIG. 4A obtained by analysis.

FIG. 4C shows sample advertisements determined and identified according to the node features in the two sample pages obtained by analysis as well as a preset rule.

DETAILED DESCRIPTION OF THE PREFERRED EMBODIMENTS

Figure 1:
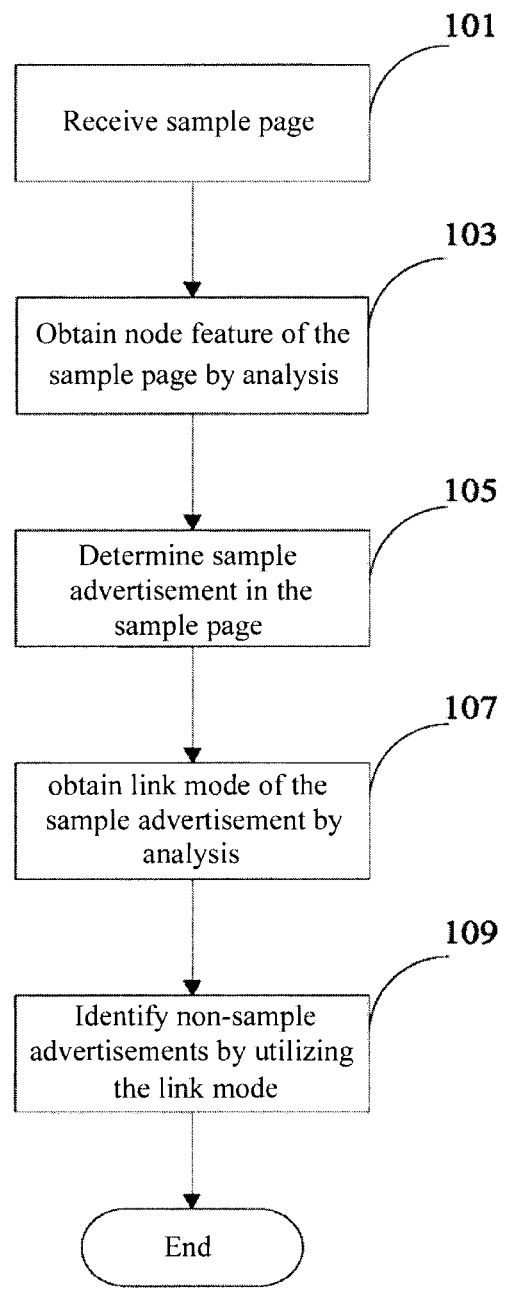
FIG. 1 shows a flowchart of a method for identifying advertisements in a web page according to an embodiment of the invention.

The above and other features of the present invention will become more distinct by a detailed description of embodiments shown in combination with attached drawings. Identical reference numbers represent the same or similar parts in the attached drawings of the invention.

Advertisements which were originally broadcasted on television and buildings have increasingly flowed into Internet. The significance of putting advertisements on the Internet cannot be ignored in order to achieve a better propaganda effect. Internet advertisements are being welcomed more and more by corporations due to its features of form diversity, fast production, and ease of change. For many Internet content providers, especially for large-scale portal websites, Internet advertising revenue has become one of their main revenue streams and profit sources. An Internet content provider or a website often charges an advertiser an advertising fee by counting the click volume of an advertisement by users.

Many corporations are significantly interested in advertising on the Internet. The advertisement information can be used in multiple advertisement data applications. For example, the advertising investment of a rival is estimated based on the distribution situation of Internet online advertisements. However, due to the diversity of typeset layouts and format types among different websites and web pages, it is difficult to accurately detect different advertisements coming from different web pages. Even within the same web page, a change in advertiser can result in a change in advertisement placement. Thus, it is difficult to accurately discover advertisements in a web page.

A detailed description of a method and system for identifying advertisements in a web page as provided by an embodiment of the present invention is be made with reference to attached drawings.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 shows a flowchart of a method for identifying advertisements in a web page according to an embodiment of the invention. In FIG. 1, the process starts from 101 where a sample page is received. The sample page refers to either a web page or a website that is input for retrieving advertisements included in it. The sample page can be (1) specified or input by a user, or (2) captured randomly or in accordance with a certain rule. The sample page can be either one web page or a plurality of web pages. The reception of the sample page in step 101 can be direct reception of a web page of the sample page in one embodiment according to the invention, reception of a URL address of the sample page in another embodiment according to the invention, or reception of source code such as HTML source code of the sample page in a further embodiment according to the invention.

After the sample page is received, the sample page is analyzed to obtain a node feature in step 103. The analysis includes the step of analyzing the source code of the sample page. The source code includes any source code which can be used to display web pages such as HTML.

The concept "a node of a web page" needs to be illuminated. It is well known by those skilled in the art that a web page exists in the form of a DOM Tree structure in the HTML code, with respective nodes of the tree structure being the nodes of the web page. For example, the following is sample HTML code:

<a href="http://www.w3schools.com">Visit W3Schools.com!</a>

The HTML code points at the link "http://www.3schools.com". Corresponding anchor text is displayed as "Visit W3Schools.com!". The tag "<a>" defines a page node. This type of page node can be used in two modes: (1) create a link to another file (page) and (2) create a bookmark within a file. The HTML code which is bracketed by the angle brackets in the HTML source code is the node of the web page. The node feature of the sample page can include one or more of the following parameters: location, shape, height, width, area and type. The node feature can also include other parameters other than these parameters as long as they are the parameters for describing the features of the node. Those skilled in the art can select one or more of these parameters as the node features of the sample page.

According to an embodiment of the invention, parameters, such as length and width, are obtained by executing the source code of the sample page. This is specifically described in FIG. 4A, FIG. 4B and FIG. 4C and their corresponding literal descriptions. According to another embodiment of the invention, the parameter information regarding features of respective nodes can be included in the source code of the sample page. Parameters for node features of the sample page can be obtained by directly reading the source code of the sample page. For example, in <img src="adl.jpg" align="bottom" width="240" height="80"/>, the parameters of location (align), width and height are defined. The feature information of the page node can be obtained by reading such HTML code. It should be understood by those skilled in the art that it can fall into the protection scope of the invention no matter what manner is employed to obtain the node feature of the sample page.

A sample advertisement in the sample page is determined in step 105 in accordance with the node feature of the sample page obtained in step 103 and a preset rule. Here, the preset rule defines features within a page node which are characteristic of advertisements. Also, the preset rule can be set in accordance with one or more parameters such as location, shape, height, width, area and type.

According to an embodiment of the invention, a sample advertisement in the sample page is determined by matching the preset rule with the node feature. For example, a preset rule can define an advertising node as any image node with a height between 60 px and 100 px (the parameter of height) and a width between 200 px and 500 px (the parameter of width). Accordingly, after the node feature of the sample page is obtained in step 103, the obtained node feature can be matched with the rule, and any node which meets the preset rule's criteria is determined to be a sample advertisement.

In step 107, the sample advertisement is analyzed to obtain a link mode. A sample advertisement's link mode refers to common URL modes or features that are common in the sample advertisement. Although URL addresses of different sample advertisements can be different, URL addresses of advertisements on most websites have a fixed mode. Therefore, the common mode of the sample advertisement's URL addresses is analyzed in step 105. In other words, the modes of the advertisement's URL addresses on the sample page and the website where the sample page is located are obtained. According to one embodiment of the invention, the common mode or feature of the URL addresses of different sample advertisements can be analyzed utilizing a table shown in FIG. 3. The table shown in FIG. 3 shows the analysis of the URL addresses of two sample advertisements, assuming that only two sample advertisements are obtained by analyzing the sample page:

URL for sample advertisement 1:
http://host.company.com/ads/click.jsp?id=103&type=c
URL for sample advertisement 2:
http://host.company.com/ads/click.jsp?id=20&type=df According to the table shown in FIG. 3, it can be seen that Protocol, Host, Site, Path, Page, Parameter) and Parameter 2 of the sample advertisement 1 and the sample advertisement 2 are the same except for the values of Parameter) and Parameter 2. Thus, the link mode for all advertisements on the website of www.company.com is as follows:

http://host.company.com/ads/click.jsp?id=Numbers&type=Characters

It is to be noted that the table shown in FIG. 3 is only for illustration. Those skilled in the art can employ any other tools to obtain the link mode of the obtained sample advertisement.

Next, in the step 109, advertisements other than the sample advertisement are identified utilizing the link mode of the sample advertisement obtained in step 107. According to one embodiment of the invention, advertisements other than the sample advertisement are identified by matching the link mode with links (URL) of other page nodes, other than the page node of the sample advertisement. According to another embodiment of the invention, the advertisements other than the sample advertisement are identified utilizing a method for a regular expression. The so-called regular expression is one formula for matching one type of character string by using a certain mode. "A certain mode" refers to the link mode obtained by analysis, and "one type of character string" refers to links (URL) for other nodes other than the node of the sample advertisement. The meaning and function of the regular expression should be understood by those skilled in the art, which will not be described in detail.

In step 109, other advertisements other than the sample advertisement are identified. The identification of the other advertisements does not necessarily refer to the identification of all the non-sample advertisements on the website. Those skilled in the art can define a range of identification depending on actual requirements. For example, it can be defined that only some of the page nodes on some web pages are identified. Since large-scale portal websites have a large number of web pages, the identification of advertisements can be restricted to a subset of a website's web pages in order to reduce computation and improve efficiency. For example, if the link for one page node other than above two sample advertisements on the sample page is:

http://host.company.com/ads/click.jsp?id=777&type=kk

The above link mode obtained by analysis is matched with the link of the page node. If it is found that matching is successful, the page node is identified as an advertisement on the sample page.

Figure 2:
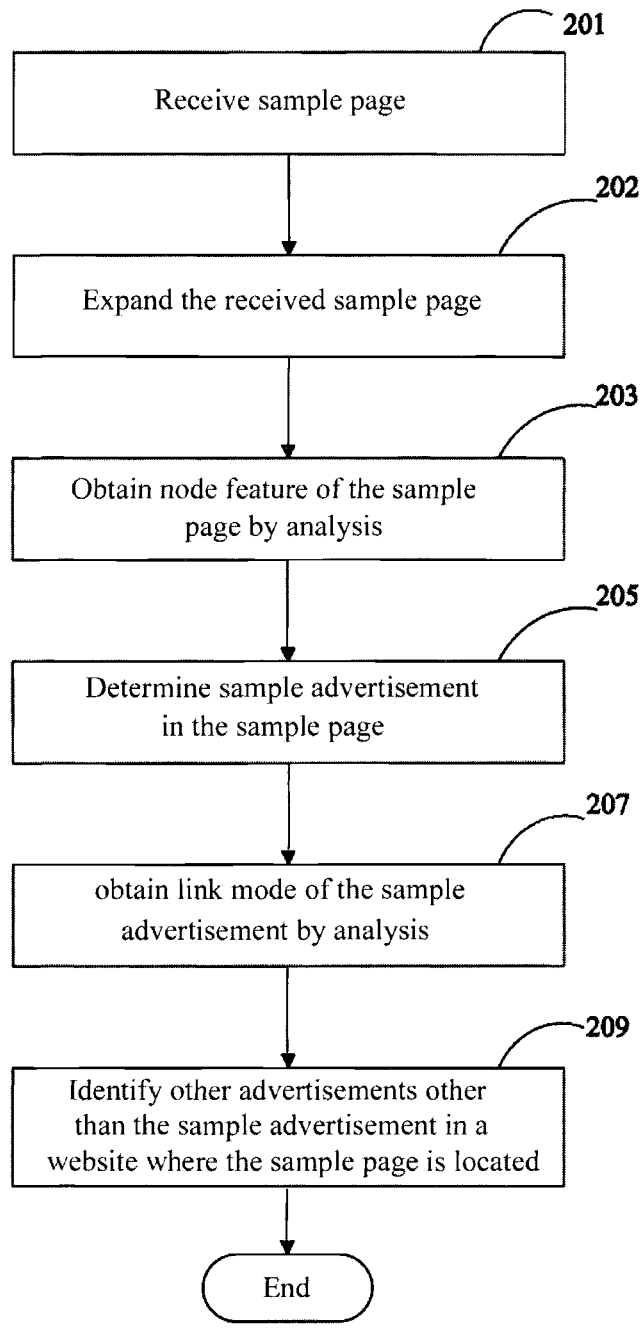
FIG. 2 shows a flowchart of a method for identifying advertisements in a web page according to another embodiment of the invention.

FIG. 2 shows a flowchart of a method for identifying advertisements in a web page according to another embodiment of the invention. Steps 201, 203, 205, 207 and 209 in FIG. 2 correspond to steps 101, 103, 105, 107 and 109 in FIG. 1 respectively. In step 202, the sample page received in step 201 is expanded. The expansion refers to expansion of the amount of sample pages. Specifically, a certain amount of other web pages located in the same website as the received sample page can be acquired automatically, and the acquired other web pages are regarded as the sample pages to be subsequently processed. The expansion is made because a small amount of sample pages may not be sufficient to determine a sample advertisement matching with the preset rule. For example, if only one sample page on a certain website is input by a user, and there is just no sample advertisement matching with the preset rule on the sample page, no sample advertisement is discovered. Therefore the link mode of the sample advertisement is not obtained.

Further, obtain a link mode that sample advertisements commonly have may be difficult if there are only a small number of sample advertisements which match the preset rule. In addition, there can be several page nodes which meet the preset rule's criteria but are not advertising nodes. Additionally, the link modes of several sample advertisements can different from the link modes for most advertisements on the web page or website. Accordingly, in view of high requirements for precision and precision, sample pages are quantitatively expanded and used to perform the subsequent steps or 203-209. It should be understood by those skilled in the art that the step 202 of expanding the received sample pages is only one embodiment according to the invention. Performing the subsequent operations without expanding the received sample pages is allowable since it does not influence the technical effect of the invention.

FIG. 4A, FIG. 4B, and FIG. 4C show an example of the determination of a sample advertisement on a sample page according to one embodiment of the invention.

FIG. 4A shows two exemplary sample pages and their corresponding HTML source codes according to the invention. Sample page 1 and sample page 2 are two web pages under the same website. It can be seen from FIG. 4A that the sample page 1 includes four nodes: (1) a title node of "Sample page 1", (2) a text node of "bla bla bla bla . . . ", (3) an image link node of "Advertisement 1" and (4) a text link node of "advertisement for company d". From the HTML source code corresponding to the sample page 1, these four nodes are clearly seen. Further, the parameter information for the node features such as length, width and location of the respective nodes is not included in the HTML source code.

In this case, in order to obtain by analysis the feature information for four nodes of sample page 1, the HTML source code of sample page 1 is read and delivered to an existing browser kernel to be executed. This allows the page presentation effect to be obtained. Next, the browser kernel invokes four nodes in the sample page 1 respectively based on the execution results, to acquire the node feature information of the length and width of the pages, and also returns a result. Those skilled in the art can employ other methods to obtain a page node's feature information.

FIG. 4B shows the node feature of FIG. 4A's sample page 1 obtained by analysis. Node feature information is obtained by analysis for both sample page 1 and the sample page 2, however, for simplicity, only feature information of node "Advertisement 1" in the sample page 1 is shown in FIG. 4B as "Left 8 px, Upper 124 px, Width 325 px, Height 91 px". Those skilled in the art know that "px" refers to a pixel point. It is assumed that there is a preset rule which states: "if 200 px<width<500 px and 60 px<height<100 px, then select node a". This means that for a node "a", if its width is greater than 200 px and less than 200 px, and its height is greater than 60 px and less than 100 px, then the node "a" is a advertising node. The feature of the node "Advertisement 1" in the sample page 1 falls within the preset rule's criteria, therefore the node "Advertisement 1" in sample page 1 is determined to be a sample advertisement. In the same way, the node "Advertisement 2" in the sample page 2 is also determined to be a sample advertisement, assuming that the feature of the node "Advertisement 2" in the sample page 2 also falls within the preset rule's criteria. The automatically identified sample advertisement 1 and sample advertisement 2 are shown in FIG. 4C.

The URLs of the identified sample advertisement 1 and sample advertisement 2 shown in FIG. 4C are analyzed. Their URL addresses respectively are:

Sample advertisement 1: http://host.company.com/ads/click.jsp?id=103&type=c

Sample advertisement 2: http://host.company.com/ads/click.jsp?id=20&type=df

The link modes for the two sample advertisements can be obtained by analysis as follows:

http://host.company.com/ads/click.jsp?id=Numbers&type=Characters

The "Number" and "Characters" expressed in bold in the link mode means that values for the two parts can be changed, while the remaining parts of the URL addresses are the same. Next, this link mode is to be matched with all other nodes in the sample page 1 and the sample page 2. No advertisement other than the two sample advertisements in the sample page 1 and the sample page 2 are found.

This link mode can be further matched with nodes of all other web pages in the website www.company.com where the sample page 1 and the sample page 2 are located, so that all advertisements under the website are identified. In order to avoid excessively huge computations, it can also be specified that the matching is performed in some web pages under the website so as to identify all advertisements in the specified web pages.

Figure 5:
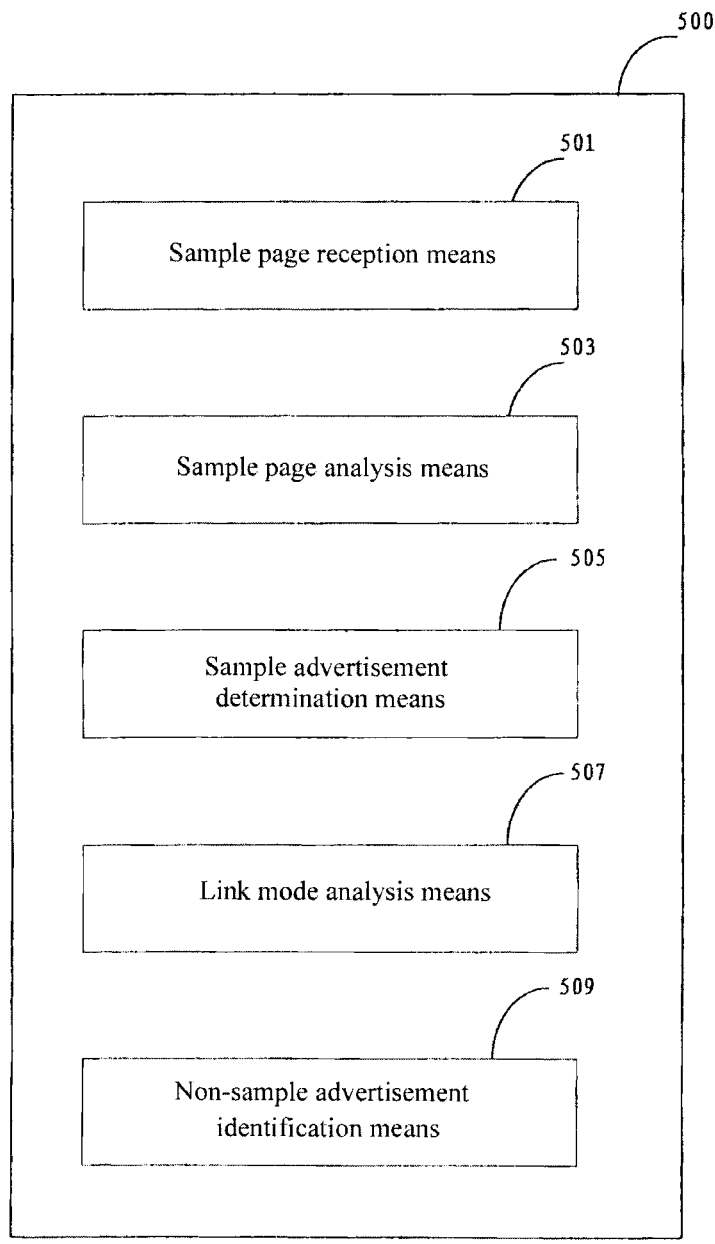
FIG. 5 shows a block diagram of a system for identifying advertisements in a web page according to an embodiment of the invention.

FIG. 5 shows a block diagram of a system for identifying advertisements in a web page according to an embodiment of the invention. The system is denoted by 500 as a whole in FIG. 5. Specifically, the system 500 includes a sample page reception means 501, a sample page analysis means 503, a sample advertisement determination means 505, a link mode analysis means 507 and non-sample advertisement identification means 509. The sample advertisement reception means 501 is used for receiving a sample page. The sample page analysis means 503 is used for obtaining a node feature of the sample page by analyzing the source code of the received sample page. The sample advertisement determination means 505 is used for determining a sample advertisement in accordance with a preset rule and the obtained node feature of the sample page. The link mode analysis means 507 is used for analyzing the link mode of the sample advertisement. The non-sample advertisement identification means 509 is used for identifying other advertisements other than the sample advertisement on the website where the sample page is located. The respective means 501-509 contained in the system 500 correspond to steps 101-109 in the method shown in FIG. 1 respectively, so that all contents recorded in the literal description of FIG. 1 are applicable to the system 500.

Figure 6:
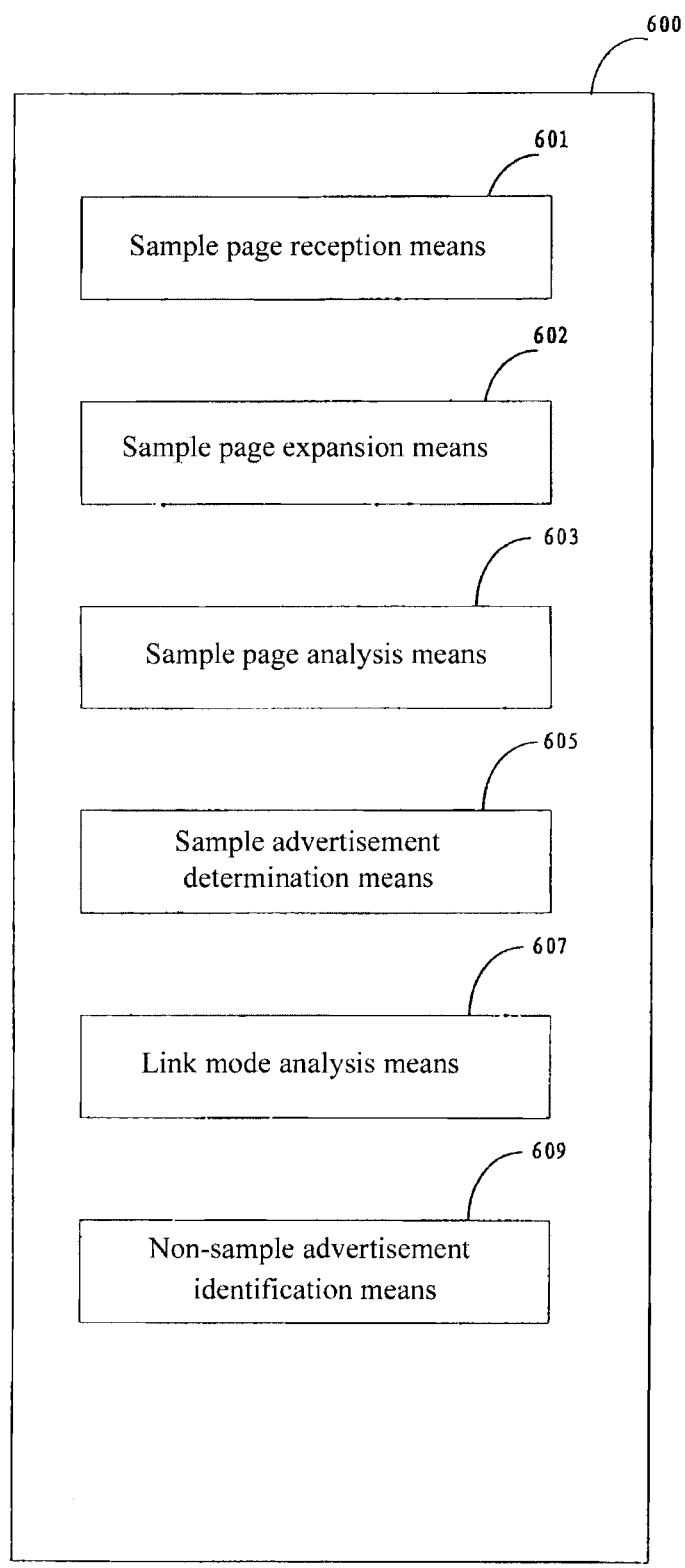
FIG. 6 shows a block diagram of a system for identifying advertisements in a web page according to another embodiment of the invention.

FIG. 6 shows a block diagram of a system for identifying advertisements in a web page according to another embodiment of the invention. The system is denoted by 600 as a whole in FIG. 6. Specifically, the system 600 includes a sample page reception means 601, a sample page expansion means 602, a sample page analysis means 603, a sample advertisement determination means 605, a link mode analysis means 607 and a non-sample advertisement identification means 609. The sample page reception means 601, the sample page analysis means 603, the sample advertisement determination means 605, the link mode analysis means 607 and the non-sample advertisement identification means 609 in the system 600 are respectively correspond to steps 101-109 in the method shown in FIG. 1. Also, the means 601, 603, 605, 607 and 609 simultaneously and respectively correspond to means 501-509 in the system 500 shown in FIG. 5. At the same time, the means 601, 603, 605, 607 and 609 contained in the system 600 shown in FIG. 6 correspond to steps 201-209 in the method shown in FIG. 2 respectively. The sample page expansion means 602 is used for expanding the sample page received by the sample page reception means 601. All of contents recorded in the literal description of FIG. 1 and FIG. 2 are applicable to system 600.

Through the above description of specific embodiments, it can be understood by those skilled in the art that the system, means and method as described above can be implemented by using computer executable instructions and/or being contained in processor control codes, for example, such codes are provided on an carrier medium such as a disk, CD or DVD-ROM, an programmable memory such as a read-only memory (firmware), or a data carrier such as a optical or electronic signal carrier. The means, server and its unit can be implemented by a hardware circuit of a super large-scale integrated circuit or gate array, a semiconductor such as a logic chip, transistor and so on, or a programmable hardware device such as a field programmable gate array, programmable logic device and so on, or by software executed by a variety of processors, or by a combination of above hardware circuit and software.

Although detailed description of the system and method for identifying advertisements in a web page according to the invention has been made in combination with the above specific embodiments, the present invention is not limited thereto. Various variations, alternations and modifications to the invention can be made by those skilled in the art under teachings of the specification without departing from the scope and principle of the invention. It should be understood that all such variations, alternations and modifications still fall into the protection scope of the invention which is defined by the attached claims.

The invention claimed is:

1. A method for identifying an advertisement in a web page, the method comprising the steps of:
   receiving a sample page; analyzing a node of said sample page to determine a node feature wherein i) said node is a Document Object Model (DOM) Tree node in a source code of said sample page, ii) said node feature comprises a parameter of said node and iii) said node feature parameter is selected from a group consisting of location, shape, height, width, area, and type; matching said node feature to a preset rule to find a first sample advertisement and a second sample advertisement in said sample page;
   analyzing a first link of said first sample advertisement to obtain a first common mode of said first sample advertisement, said first common mode including an internet protocol, a host, a site, a path, a page, and a parameter with a first value;
   analyzing a first link of said second sample advertisement to obtain a second common mode of said second sample advertisement, said second common mode including said internet protocol, said host, said site, said path, said page, said parameter with a second value; wherein said first link and said second link are the same except for said values of said parameters;
   analyzing said first common mode and said second common mode to obtain a link mode; and
   utilizing said link mode to identify a third advertisement by matching said internet protocol, said host, said site, said path, said page, and said parameter of said link mode to another link,
   wherein at least one of the steps is carried out using a computer device so that said advertisements in a web page is identified.

2. The method according to claim 1, wherein said step of receiving said sample page further comprises the step of: obtaining a plurality of sample pages by expanding said sample page in a website where said sample page is located.

3. The method according to claim 1, wherein said third advertisement is located in said sample page.

4. The method according to claim 1, wherein said preset rule depends on at least on a value associated with said node feature parameter.

5. A system for identifying advertisements in a web page, comprising: a processor configured to:
   receive a sample page;
   analyze a node of said sample page to determine a node feature wherein i) said node is a Document Object Model (DOM) Tree node in a source code of the sample page, ii) said node feature comprises a parameter of said node and iii) said node feature parameter is selected from a group consisting of location, shape, height, width, area, and type; match said node feature to a preset rule to find a first sample advertisement and a second sample advertisement in said sample page;
   analyze a first link of said first sample advertisement to obtain a first common mode of said sample advertisement said link mode including an internet protocol, a host, a site, a path, a page, and a parameter with a first value;
   analyze a first link of said second sample advertisement to obtain a second common mode of said second sample advertisement, said second common mode including said internet protocol, said host, said site, said path, said page, said parameter with a second value; wherein said first link and said second link are the same except for said values of said parameters;
   analyze said first common mode and said second common mode to obtain a link mode; and
   utilize said link mode to identify a third advertisement by matching said internet protocol, said host, said site, said path, said page, and said parameter of said link mode to another link.

6. The system according to claim 5, wherein said processor is further configured to: expand said sample page to obtain a plurality of sample pages.

7. The system according to claim 5, wherein said third advertisement is located in said sample page.

8. The system according to claim 5, wherein said preset rule depends on said node feature parameter.

9. A non-transitory computer readable storage medium tangibly embodying a computer readable program code having computer readable instructions which when implemented, cause a computer to carry out the steps of a method comprising:
   receiving a sample page;
   analyzing a node of said sample page to determine a node feature wherein i) said node is a Document Object Model (DOM) Tree node in a source code of the sample page, ii) said node feature comprises a parameter of said node and iii) said node feature parameter is selected from a group consisting of location, shape, height, width, area, and type;
   matching said node feature to a preset rule to find a first sample advertisement and a second sample advertisement in said sample page;
   analyzing a first link of said sample advertisement to obtain a first common mode of said first sample advertisement, said first common mode including an internet protocol, a host, a site, a path, a page, and a parameter with a first value;
   analyzing a first link of said second sample advertisement to obtain a second common mode of said second sample advertisement, said second common mode including said internet protocol, said host, said site, said path, said page, said parameter with a second value; wherein said first link and said second link are the same except for said values of said parameters;
   analyzing said first common mode and said second common mode to obtain a link mode; and
   utilizing said link mode to identify a second advertisement by matching said internet protocol, said host, said site, said path, said page, and said parameter of said link mode to another link.

10. The computer readable storage medium according to claim 9, wherein said receiving step further comprises the step of: obtaining a plurality of sample pages by expanding said sample page in a website where said sample page is located.

11. The method according to claim 4, wherein said link mode further comprises another parameter.

12. The method according to claim 11, wherein said preset rule depends on at least one value associated with said another parameter.

13. The system according to claim 5, wherein said link mode further comprises another parameter.

14. The system according to claim 13, wherein said preset rule depends on at least one value associated with said another parameter.

15. The computer readable storage medium according to claim 9, wherein said link mode further comprises another parameter.

16. The system according to claim 15, wherein said preset rule depends on at least one value associated with said another parameter.

* * * * *